Sept. 24, 1963     J. E. CANDLIN, JR., ETAL     3,104,624
COMPARTMENTIZER PIVOT SUSPENSION
Filed Aug. 20, 1959     2 Sheets-Sheet 2
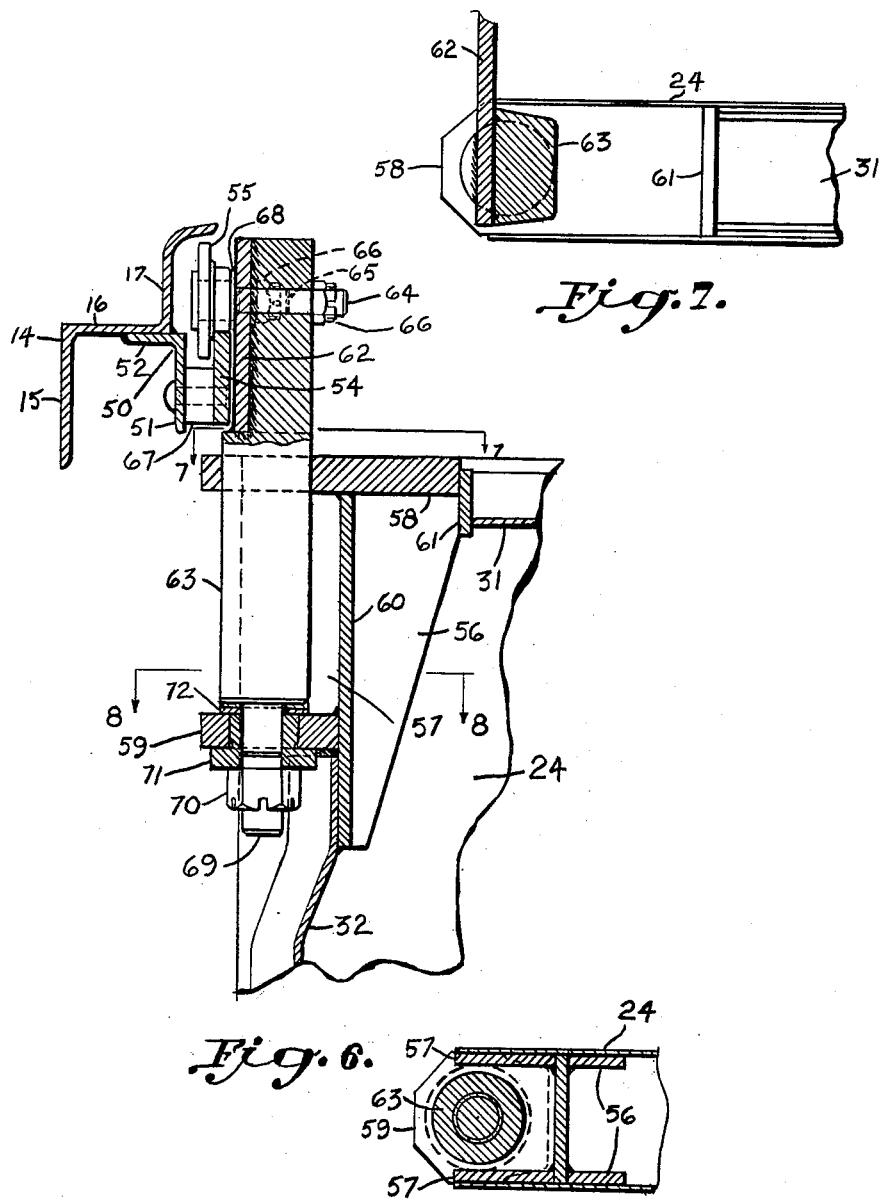
Inventor
James E. Candlin, Jr
Andrew J. Christian
By Wayne Morris Russell
Attorney 3,104,624
COMPARTMENTIZER PIVOT SUSPENSION
James E. Candlin, Jr., Lansing, and Andrew J. Christian, Chicago, Ill., assignors to Pullman Incorporated, Chicago, Ill., a corporation of Delaware
Filed Aug. 20, 1959, Ser. No. 835,047
3 Claims. (Cl. 105—376)

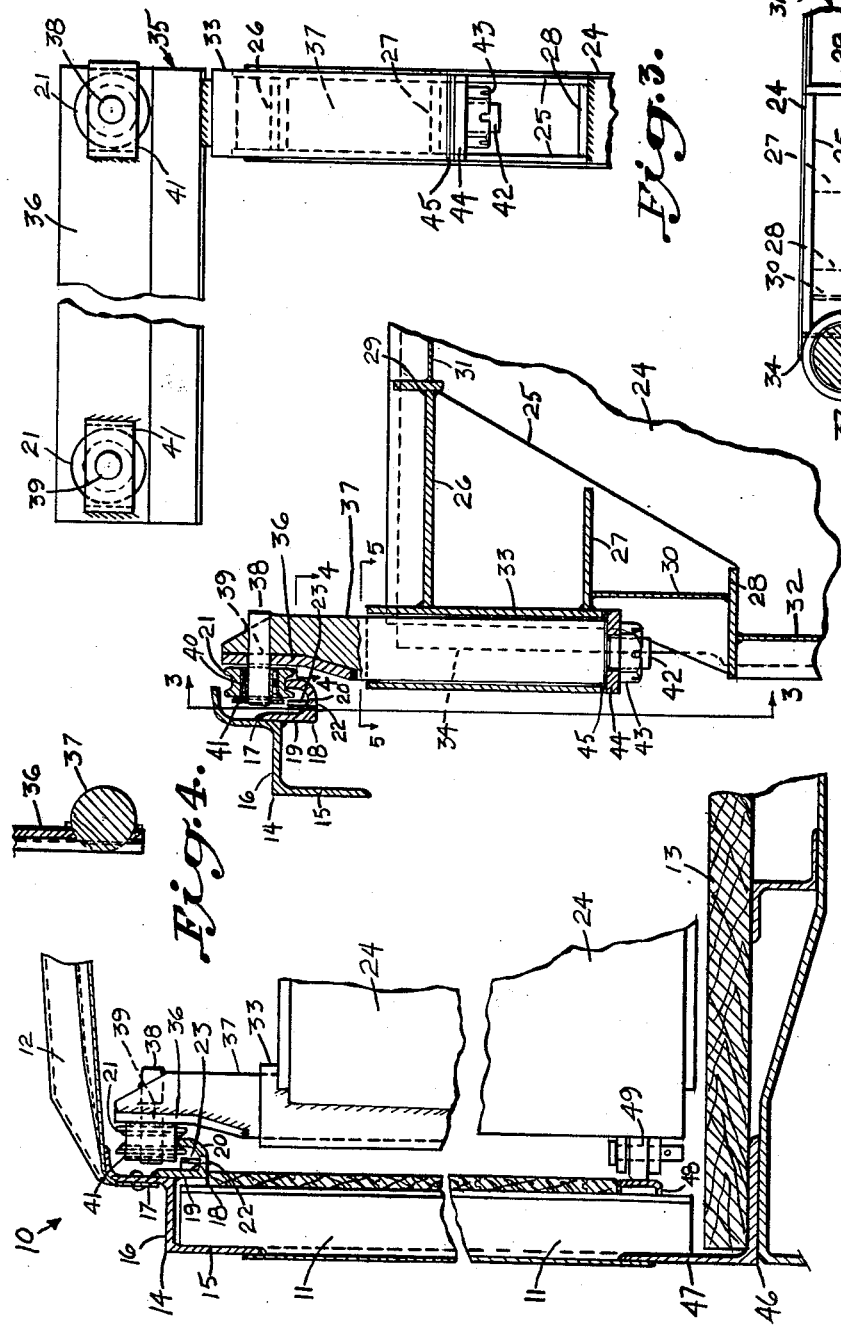

This invention relates to a pivot suspension arrangement for a compartmentizer for use in freight vehicles.

The principal object of the invention is to provide a pivot suspension arrangement for a compartmentizer for use in freight vehicles which meets the requirements as to strength demanded by the heavy duty service to which such vehicles are subjected.

An important object of the invention is the provision of a trolley arrangement having a vertical depending pivot arm which is pivotally connected to the gate of a compartmentizer at its upper outer edge whereby the gate is suspended in a freight vehicle.

Another object is to provide a longitudinally disposed trackway which is secured to the side wall structure of a freight vehicle adjacent the top thereof for movably supporting the trolley and pivot suspension of a compartmentizer gate.

A further object comprehends a compartmentizer gate having a vertical sleeve member at its upper outer edge for pivotally suspending the gate in a freight vehicle.

A still further object contemplates a compartmentizer gate having a top bearing lug and a supporting lug spaced below and underlying the top bearing lug at the upper outer edge of the gate for pivotally suspending the gate in a freight vehicle.

The foregoing and other objects of the invention are attained by the construction and arrangement illustrated in the accompanying drawings wherein:

FIG. 1 is a vertical fragmentary sectional view through the body of a railway box car showing the upper and lower outer corner portions of a compartmentizer gate in transverse position in the vehicle including the pivot suspension of this invention;

FIG. 2 is a vertical sectional view through the compartmentizer gate at the pivot suspension showing the supporting sleeve, pivot pin, trolley wheel and track;

FIG. 3 is a vertical elevation view taken on plane 3—3 in FIG. 2 with the car structure removed;

FIG. 4 is a horizontal sectional view taken on line 4—4 in FIG. 2;

FIG. 5 is a horizontal sectional view taken on line 5—5 in FIG. 2;

FIG. 6 is the same as FIG. 2 except showing a modified form of the invention;

FIG. 7 is a horizontal sectional view taken on line 7—7 in FIG. 6; and

FIG. 8 is a horizontal sectional view taken on line 8—8 in FIG. 6.

The compartmentizer referred to herein is a movable bulkhead arrangement which is used in freight vehicles for holding portions of the lading in place in the vehicle to prevent the lading from shifting and thereby causing damage to either or both the lading and the vehicle.

The compartmentizer includes a pair of mated gates each of which extends transversely substantially from one side wall of the vehicle to the longitudinal center line thereof and vertically substantially from the floor of the vehicle to adjacent the roof structure thereof. Each gate is movably mounted in the vehicle at its outer edge portion and may be easily moved longitudinally of the vehicle and positioned transversely of the vehicle at any of a plurality of selective locations lengthwise of the vehicle. Locking means are provided for securing the gates in transverse position at any of the selective locations. Hinging means also provided at the outer edge portion of each gate permits the gates to be swung to a position parallel with the side walls of the vehicle when the gates are not in use or for vehicle loading and unloading operations.

In the drawings 10 represents a railway freight vehicle which, as shown in FIG. 1, is of the box car type having centrally located side door openings and includes a side wall 11, a roof 12 and a floor 13. A longitudinally extending side plate 14 is disposed at the juncture of the side wall 11 and roof 12. The side plate member includes a depending flange 15, a generally horizontal web portion 16 and an upwardly and inwardly directed flange 17 upon which the roof is supported and secured. The side wall is secured to the depending flange 15 of the side plate. A combined trolley trackway and side plate reinforcement member 18, having an upwardly directed flange 19 and an inwardly and upwardly directed flange 20, is longitudinally disposed against and secured to the inner face of the upwardly and inwardly directed flange 17 of the side plate. The upwardly directed portion of flange 20 is spaced inwardly of flange 19 to form a trackway for supporting the double flanged trolley rollers 21 as will later be described. Drainage slots 22 are provided at longitudinally spaced intervals in the inwardly directed portion of flange 20. The safety stop member 23 provided at the inside corner of the trolley trackway member 18 extends longitudinally across the width of the car side door opening to prevent the trolley rollers 21 from becoming disengaged on the trackway as will later be expained. The safety stop member 23 has horizontally tapered ends to permit free longitudinal movement of the trolley rollers 21.

The compartmentizer gate represented generally by numeral 24 comprises a double plate construction with the plates in parallel spaced relationship and having stiffener members disposed between and secured to the plates. As shown in FIG. 2, reinforcement plates for supporting the gate are provided in the upper outer corner portion of the gate comprising a pair of gusset plates 25 each of which is vertically disposed against and secured to the inner surface of one of the main outer plates of the gate. Extending between and secured at their edges to the gusset plates 25 are three horizontal web plates 26, 27 and 28. Plate 26 being disposed closely adjacent to the upper edges of the gusset plates 25 extends inwardly and is secured to a vertical web plate 29 which also extends between and is secured at its edges to the gusset plates 25. Plates 27 and 28 are vertically spaced below plate 26 with plate 28 disposed at the lower edges of the gusset plates 25 and plate 27 disposed generally intermediate plates 26 and 28. Vertical web plate 30 extends horizontally between and is secured at its vertical edges to the gusset plates 25 and extends vertically between and is secured at its horizontal edges to plates 27 and 28. The end of the top edge channel 31 of gate 24 is secured to plate 29 and the end of the outer side edge channel 32 is secured to plate 28. A vertical sleeve member 33 is provided at the outer edge of the gate 24 extending downwardly from closely adjacent the top edge of the gate to closely adjacent plate 27. The sleeve 33 is secured by welding to the gusset plates 25 and to the web plates 26 and 27. The main outer plates of gate 24 are secured at their edges to sleeve 33 by means of arc-welds 34. Thus it can be seen that sleeve 33 is disposed substantially within gate 24 and forms an integral part thereof. The bottom edge of sleeve 33 forms a lower horizontal supporting bearing as hereinafter will become more clearly understood.

Numeral 35 represents a trolley and pivot suspension assembly which is mounted at trackway 20 and from which the compartmentizer gate 24 is suspended. The assembly includes a main angular shape member having a horizontal arm portion 36 and a vertical arm portion 37. The horizontal arm 36 is longitudinally disposed inwardly at track 20 and is supported by means of two horizontal pivot pins 38 and 39 which are spaced longitudinally to provide a support adjacent each end of the arm. Pin 38 extends through a hole in the arm 36 and through a matching hole in the top portion of the arm 37 and is secured thereto. Pin 39 extends through a hole in arm 36 and is secured thereto. Both pins 38 and 39 extend outwardly from the arm 36 and a double flanged roller 21 is mounted on each outer end portion of each pin. The rollers 21 are mounted on the pins with a roller type bearing 40 to permit free rotation of the rollers during longitudinal movements of the trolley. The rollers are disposed to fit centrally over the trackway 20 with the center portion of the rollers peripherally engaged with the top edge surface of the trackway. The roller flanges extending downwardly and overlapping the top contacting surface of the trackway serve as a guide during longitudinal movements of the trolley and also aid in guarding against any possibility of the rollers leaving the trackway. A channel shaped clip 41 is provided at each roller 21 for retention with the arm 36. The channel clips 41 are vertically disposed over the rollers with the channel flanges inwardly directed and having their inner edges applied against and secured to the arm 36. A centrally located hole is provided in the web portion of each clip to fit over the outer edge portion of the pivot pins 38 and 39 respectively.

The vertical arm portion 37 of the trolley and pivot suspension assembly 35 is generally circular shape in section and extends downwardly from the horizontal arm portion 36 through the vertical sleeve member 33 of the gate 24. The lower end portion 42 of the arm 37 extends beyond the lower edge of the sleeve 33 in the form of a shoulder bolt which is threaded to match the threaded holding nut 43. Wearing and supporting washer 44 and shim washers 45 for gate height adjustment are provided between the bottom edge of the sleeve 33 and the nut 43. Application of the nut 43 at the end portion 42 of the arm 37 along with washers 44 and 45 secures the gate 24 to the trolley and pivot suspension assembly 35 whereby a pivotal connection is provided between the gate and the trolley and with the trolley mounted on and supported by the trackway 20, the gate is suspended in the car. In addition to providing a support for suspending the gate in the car, sleeve 33 also provides a vertical circular bearing for the vertical pivot arm 37 especially adjacent the top and bottom of the sleeve to support the weight of the gate in the car. The sleeve and arm each being relatively long in length form an elongated pivotal connection which serves to stabilize the gate to prevent it from canting with respect to the horizontal trolley portion 36 of the assembly 35. While the holding nut 43 is shown as a slotted nut other equivalent fastening means may be used.

The floor 13 of the car is supported and secured to the underframe structure and while shown as a wooden floor it may be made of steel or other suitable material. The underframe structure includes a side sill member 46 having an upstanding flange 47 to which the side wall structure is attached. Closely adjacent the bottom edge of the side wall structure is a channel shaped rub rail member 48 extending longitudinally with the channel flanges outwardly directed and having their outer edges applied against and secured to the side wall structure. Attached to the gate 24 and in horizontal alignment with the rail member 48 is a horizontally disposed roller type guide 49 which is for the purpose of holding the gate in vertical alignment. The roller 49 is peripherally engaged with the inner surface of the rail member 48 to provide an anti-friction type of guide and stabilizer during movements of the gate 24 longitudinally of the car. While a roller type guide is shown there are other suitable types that might be used; but since the lower guiding means constitutes no part of the present invention, it is not illustrated in detail.

In applying the gate 24, including the trolley and pivot suspension assembly 35, to the car, the gate is located at the side door opening of the car and placed in position parallel to the side wall of the car. The gate is then lifted and the outer flanges of the trolley rollers 21 are hooked over the top edge of the trackway 20 by moving the gate outwardly at the bottom through the side door opening of the car. After the rollers have been mounted in place on the trackway, the gate is returned to vertical position and shifted longitudinally of the car to a location beyond the side door opening. The safety stop member 23 is then tack-welded in place at the door opening. The safety stop 23 limits the outer movement of the gate at the outer flanges of the trolley rollers and thus prevents the trolley rollers from becoming disengaged from the trackway when the gate is positioned at the side door opening or is being shifted at the door opening. For removal and replacement of the gate the safety stop 23 is removed by clipping loose at the tack welds.

In FIGS. 6, 7 and 8, which illustrate a modified form of the invention, a side plate reinforcement member 50, having a depending flange 51 and a horizontal outwardly directed flange 52, is longitudinally disposed against and secured to the bottom surface of the web 16 of the side plate 14. The vertical plate 54 is inwardly spaced from the depending flange 51 of the reinforcement 50 and extends longitudinally to form a trackway at its top edge for the trolley rollers 55. A plurality of spacer members 67 are provided at longitudinally spaced intervals for securing the trackway plate 54 to the depending flange 51 of the reinforcement 50.

Reinforcement plates are provided at the upper outer corner portion of the gate 24 comprising the vertically disposed plates 60 and 61 which extend horizontally between the main outer plates of the gate. Gusset plates 56 and 57 are provided on each side of the gate in vertical position against the inner surface of each main outer plate of the gate. The horizontally disposed top plate 58 forming an upper pivot bearing extends widthwise between the main outer plates of the gate and lengthwise from plate 61 to a point closely adjacent to the outer edge of the gate. Plate 59 forming a lower pivot bearing and support is vertically spaced below and underlies the outer end portion of plate 58. All of the joints between the plates 56, 57, 58, 59, 60 and 61 and between the plates and the main outer gate members, including the outer plates and the edge channels 31 and 32, are made by welding. Like sleeve 33, described above, plates 58 and 59 are disposed substantially within gate 24 and each forms an integral part thereof. The bottom surface of plate 59 forms a lower horizontal supporting bearing like the bottom edge of sleeve 33 as hereinbefore described.

In general the trolley and pivot suspension assembly of the modified form of the invention is the same as in the embodiment hereinbefore described. The horizontal arm 62 of the assembly is longitudinally disposed inwardly in proximate relationship to the trackway plate 54 and is supported by means of two horizontal pivot bolts 64 and 65 which are spaced longitudinally to provide a support adjacent each end of the arm. The trolley rollers 55 have a single flange disposed outwardly from the arm 62. The pivot bolts 64 and 65 are shoulder type having a low height head at their outer ends and an inwardly directed threaded end portion. Pivot bolt 64 extends inwardly through the roller 55 and through matching holes in the arms 62 and 63 and is secured with matching threaded bolt 66 at the inwardly extending threaded end portion of the bolt. Bolt 65 is applied in the same manner except with the bolt extending through the arm 62 only. A spacer washer 68 is provided between each roller 55 and plate 62.

The vertical arm portion 63 of the assembly is generally circular shape in section and extends downwardly from the horizontal arm portion 62 through vertically aligned holes in plates 58 and 59. A flanged sleeve member 71 is provided in the hole in plate 59 and the lower end portion 69 of the arm 63 extends through the sleeve 71 in the form of a shoulder bolt which is threaded to match the threaded holding nut 70. This arrangement provides an elongated pivotal connection like the one hereinbefore described. Plate 59 is disposed in a plane located a substantial distance below plate 58 to provide vertical bearing surfaces for the lower and upper portions respectively of the vertical pivot arm 63 which like arm 37 is relatively long in length. As shown in FIG. 6, the bottom surface of plate 59 forms the supporting bearing for suspending the gate in the car. Shim washers 72 for gate height adjustment are provided between the shoulder of arm 63 and the plate 59.

From the foregoing it will be seen that the invention provides an arrangement for pivotally suspending a compartmentizer gate in a freight vehicle at the upper outer edge of the gate.

What is claimed is:

1. A compartmentizer gate for use in a freight vehicle comprising a pair of spaced apart metallic side plates, means securing said plates together in said spaced relation providing a hollow interior pocket in the upper outer corner portion of the gate, said means including a combined reinforcing and pivotal bearing and support structure mounted in said pocket, welded to the inner surfaces of the side plates in bracing relation thereto and having cylindrical vertical bearing surface portions substantially aligned with the outer edge of the gate intermediate said side plates, including a portion at substantially the level of the upper edge of the gate and a portion substantially below said level, said lower portion providing at its bottom edge a bearing surface disposed in a horizontal plane a substantial distance below the top edge of the gate and a greater distance above the bottom edge thereof, a horizontal trolley carriage including longitudinally spaced rollers adapted to ride on a longitudinally disposed supporting trackway in the vehicle, a depending pivot arm disposed substantially in vertical plane alignment with said trolley carriage and integrated thereto at its upper end and having a lower portion circular in cross section and journaled in the cylindrical vertical bearing surface portions of said combined pivotal bearing and support structure and having its lower end projecting therethrough, and a supporting fastener secured to said projecting lower end providing a horizontal bearing surface for said combined pivotal bearing and support structure, whereby said combined pivotal bearing and support structure provides the sole support of the gate vertically and pivotally in the vehicle and provides also an elongated pivotal connection which stabilizes the gate to prevent canting thereof with respect to said trolley carriage.

2. A compartmentizer gate structure as claimed in claim 1 in which the combined reinforcing and pivotal bearing and support structure includes a continuous vertical sleeve member the interior of which provides said cylindrical vertical bearing surface portions.

3. A compartmentizer gate structure as claimed in claim 1 in which the combined reinforcing and pivotal bearing and support structure includes a pair of vertically spaced horizontal plates having vertically aligned openings therein providing said cylindrical vertical bearing surface portions.

References Cited in the file of this patent

UNITED STATES PATENTS

| | | |
|---|---|---|
| 385,708 | Grannis | July 10, 1888 |
| 845,479 | Randall | Feb. 28, 1907 |
| 994,096 | Fitzgerald et al. | May 30, 1911 |
| 1,025,527 | Hunt | May 7, 1912 |
| 1,593,624 | Fairhurst | July 27, 1926 |
| 1,832,050 | Pitcher | Nov. 17, 1931 |
| 1,832,203 | Gussack | Nov. 17, 1931 |
| 2,155,463 | Angell | Apr. 25, 1939 |
| 2,360,029 | Wieden | Oct. 10, 1944 |
| 2,516,527 | Oltz | July 25, 1950 |
| 2,517,823 | Angell | Aug. 8, 1950 |
| 2,543,143 | Wells et al. | Feb. 27, 1951 |
| 2,911,925 | Adler et al. | Nov. 10, 1959 |